US010206370B2

(12) United States Patent
Huang

(10) Patent No.: US 10,206,370 B2
(45) Date of Patent: Feb. 19, 2019

(54) PET LITTER BOX CLEANING SYSTEM

(71) Applicant: Paul Huang, Alhambra, CA (US)

(72) Inventor: Paul Huang, Alhambra, CA (US)

( * ) Notice: Subject to any disclaimer, the term of this patent is extended or adjusted under 35 U.S.C. 154(b) by 107 days.

(21) Appl. No.: 15/628,943

(22) Filed: Jun. 21, 2017

(65) Prior Publication Data
US 2018/0020635 A1 Jan. 25, 2018

Related U.S. Application Data

(63) Continuation-in-part of application No. 15/373,115, filed on Dec. 8, 2016, now abandoned.

(60) Provisional application No. 62/364,787, filed on Jul. 20, 2016.

(51) Int. Cl.
A01K 1/01 (2006.01)

(52) U.S. Cl.
CPC .......... *A01K 1/0114* (2013.01); *A01K 1/0107* (2013.01)

(58) Field of Classification Search
CPC .................. A01K 1/0114; A01K 1/0107
See application file for complete search history.

(56) References Cited

U.S. PATENT DOCUMENTS

| | | | | | |
|---|---|---|---|---|---|
| 3,809,013 A | * | 5/1974 | Rigney | ................ | A01K 1/0107 119/167 |
| 3,818,865 A | * | 6/1974 | Sinclair | ................ | A01K 1/0114 119/161 |
| 3,831,557 A | * | 8/1974 | Elesh | ................... | A01K 1/0107 119/170 |
| 3,990,396 A | * | 11/1976 | Turk | ..................... | A01K 1/0107 119/170 |
| 3,990,397 A | * | 11/1976 | Lowe, Jr. | ............. | A01K 1/0107 119/165 |
| RE30,424 E | * | 11/1980 | Heldenbrand | ....... | A01K 1/0107 119/170 |
| 4,312,295 A | * | 1/1982 | Harrington | .......... | A01K 1/0114 119/167 |
| 4,505,226 A | * | 3/1985 | Carlson | ................ | A01K 1/0114 119/166 |
| 4,615,300 A | * | 10/1986 | McDonough | ........ | A01K 1/0114 119/167 |
| 4,646,684 A | * | 3/1987 | Embry | ................. | A01K 1/0107 119/167 |
| 4,784,082 A | * | 11/1988 | Wolfe | .................. | A01K 1/0107 119/167 |
| 4,870,924 A | * | 10/1989 | Wolfe | .................. | A01K 1/0107 119/167 |

(Continued)

FOREIGN PATENT DOCUMENTS

| | | | | | |
|---|---|---|---|---|---|
| WO | WO-0111947 A1 | * | 2/2001 | ........... | A01K 1/0114 |
| WO | WO-0160149 A1 | * | 8/2001 | ........... | A01K 1/0114 |

*Primary Examiner* — Joshua D Huson
(74) *Attorney, Agent, or Firm* — Clement Cheng

(57) ABSTRACT

A disposable liner assembly to be placed in a pan for the successive sifting of litter and removal of animal waste, each sheet is arranged above and below one another such that the sifting apertures in the sheet are above and below the solid portions of a sheet below and above it to form an apertures closure. Some embodiments are provided with positioning apertures in each sheet make it easy to properly offset the thin flexible sheets relative to one another. The present invention also includes a shielded liner retainer to be removably placed over the pan to cover and clamp the liners in a fix position.

20 Claims, 11 Drawing Sheets

(56) References Cited

U.S. PATENT DOCUMENTS

| | | | | |
|---|---|---|---|---|
| 5,121,712 A * | 6/1992 | Schulein, Jr. | A01K 1/0114 | 119/167 |
| 5,158,042 A * | 10/1992 | Hammerslag | A01K 1/0114 | 119/165 |
| 5,207,772 A * | 5/1993 | Lauretta | A01K 1/0114 | 119/167 |
| 5,325,815 A * | 7/1994 | Gumpesberger | A01K 1/0114 | 119/166 |
| 5,555,844 A * | 9/1996 | Kolomeyer | A01K 1/0107 | 119/165 |
| 5,564,366 A * | 10/1996 | Hancock | A01K 1/0107 | 119/165 |
| 5,752,466 A * | 5/1998 | Lundeen | A01K 1/0114 | 119/167 |
| 5,850,798 A * | 12/1998 | Engel | A01K 1/0107 | 119/170 |
| 5,890,452 A * | 4/1999 | Lundeen | A01K 1/0114 | 119/167 |
| 5,983,832 A * | 11/1999 | Seo | A01K 1/0114 | 119/166 |
| 6,135,058 A * | 10/2000 | Jaeger | A01K 1/0114 | 119/167 |
| 6,595,159 B1 * | 7/2003 | Montalbano | A01K 1/0114 | 119/167 |
| 6,668,755 B1 * | 12/2003 | Koster | A01K 1/0114 | 119/167 |
| 6,941,894 B2 * | 9/2005 | Scotto D'Anielo | A01K 1/0107 | 119/166 |
| 7,610,877 B2 * | 11/2009 | Garfield | A01K 1/0107 | 119/170 |
| 7,677,201 B1 * | 3/2010 | Eden | A01K 1/0107 | 119/165 |
| 8,074,603 B2 * | 12/2011 | Ohlman | A01K 1/0114 | 119/167 |
| 8,191,509 B2 * | 6/2012 | Fountain | A01K 1/0107 | 119/165 |
| 2002/0000205 A1 * | 1/2002 | Yamamoto | A01K 1/0114 | 119/161 |
| 2004/0118357 A1 * | 6/2004 | Lange | A01K 1/0107 | 119/167 |
| 2006/0196439 A1 * | 9/2006 | Chilcoat | A01K 1/011 | 119/165 |
| 2007/0215058 A1 * | 9/2007 | Spreitzer | A01K 1/0114 | 119/166 |
| 2007/0266953 A1 * | 11/2007 | Zoller | A01K 1/0107 | 119/169 |
| 2008/0029038 A1 * | 2/2008 | Chilcoat | A01K 1/011 | 119/165 |
| 2009/0126643 A1 * | 5/2009 | Fountain | A01K 1/0107 | 119/165 |
| 2009/0194033 A1 * | 8/2009 | Modlin | A01K 1/0107 | 119/167 |
| 2009/0283049 A1 * | 11/2009 | Spreitzer | A01K 1/0114 | 119/166 |
| 2010/0012043 A1 * | 1/2010 | Wenzel | A01K 1/0125 | 119/165 |
| 2011/0011347 A1 * | 1/2011 | Ohlman | A01K 1/0114 | 119/167 |
| 2012/0255497 A1 * | 10/2012 | Simon | B65D 5/60 | 119/165 |
| 2012/0291712 A1 * | 11/2012 | Wallace | B32B 37/12 | 119/167 |
| 2012/0325159 A1 * | 12/2012 | Penner | A01K 1/0114 | 119/166 |
| 2015/0047570 A1 * | 2/2015 | Abe | A01K 1/0107 | 119/168 |
| 2015/0334983 A1 * | 11/2015 | Kuiper | A01K 1/0114 | 119/167 |
| 2016/0029587 A1 * | 2/2016 | Kuiper | A01K 1/011 | 119/167 |
| 2016/0219828 A1 * | 8/2016 | Goerz | A01K 1/0114 | |

* cited by examiner

PET LITTER BOX CLEANING SYSTEM

This application claims priority to earlier filed. U.S. provisional application No. 62/364,787 filed Jul. 20, 2016 by inventor Paul Kuanglu Huang, entitled Pet Litter Box and Cleaning System the disclosure of which is incorporated herein by reference. This application is a continuation in part of U.S. patent application Ser. No. 15/373,115 filed Dec. 8, 2016 by same inventor Paul Huang, entitled Pet Litter Box Cleaning System the disclosure of which is incorporated herein by reference.

FIELD OF THE INVENTION

The present invention is in the field of pet litter box cleaning systems and more particularly, to a pet litter box with thin flexible sifting liners.

BACKGROUND

A pet litter box in its basic form has a cat pan made from material such as plastic or metal, and filled with waste absorbing material or "litter". Pet owners have to clean it with a scoop and periodically replace the used litter. This can be very unpleasant and inconvenient.

A set of disposable liners for a cat pan is shown in U.S. Pat. No. 5,121,712, to inventor Schulein, issued Jun. 16 1992. It provides a stack of thin, flexible sheets with a plurality of sifting apertures on each sheet which are vertically aligned with every other sheet. A shortcoming of these types of liners are that urine may pass through the aligned apertures, accumulating at the bottom layer for weeks and creating odor. Also, the wet clumping litter sticks together in some of the aligned holes, making the liners difficult to separate, so most cats (non declawed cats) may pull up the stick together liners with their claws, causing the free flowing litter to sink to the bottom through the open aligned holes and resulting not enough litter on the top layer, sometimes the whole set cannot be used anymore. Furthermore, the liners are typically secured by a rubber band to the rim of a pan, such as for example, Alpha Pet™ kitty cat premium cat pan liners and Van Ness™ sifting cat pan liners. However, it is cumbersome to apply the rubber band, and then to repeatedly remove and reapply it each time the litter is sifted. In addition, cats may claw to shreds the liners that are hanging against the walls of the pan.

U.S. Pat. No. 3,809,013, to inventors Doonan N, Hollis S, Rigney J, issued May 7, 1974. The disclosure includes a set of liners provided with flaps that close the aligned sifting apertures as long as they are in the litter box with litter on it, and open when lifted from the box. The short coming is, the aligned closable flaps tend to stick together, forming bumps on the flat surface of the liner, so non declawed cats may easily hook these bumps with their claws and pull out all the liners. The Doonan disclosure also provides a cover that can be placed over the tray and to hide the pan within the cover. However, cats may claw to pull out the liners that hanging on the rim and against the inner surface of the pan. Another type of cover of the disclosure is provided to place into the receptacle, unfortunately, the cover is loosely put on top of the uneven litter. Also, the liners are quite bulky along the exterior wall of the pan, cats may claw to shreds the overhanging liners. In addition, it still needs a rubber band to fix the liners on the rim of the pan.

U.S. Pat. No. 5,983,832, to inventor Eun Sook Seo, issued Nov. 16, 1999, is to provide a cover with open bottom that protects the liners on the rim as well as against the inner surfaces of the pan. However, the liners are quite bulky along the exterior wall of the pan, so cats may claw to shreds the overhanging liners. In addition, these covers do not include a high wall shields, so the pan has to be high enough to prevent a cat from urinating and defecating outside the pan. The higher pans require larger liners, which are difficult for pet owners to handle and the cost is higher. Furthermore, these covers do not eliminate the need for a rubber band.

U.S. Pat. No. 4,615,300, to inventor John P. McDonough, issued Oct. 7, 1986, provided an imperforate flap attached beneath the bottom of each screening layers by a flexible edge connector, the flap being large enough to cover all of the openings. The animal excrement may be screened from the litter by pulling upward on the uppermost layer, allowing the litter to pass through the openings as the flap drops down. The shortcomings are that they are too complicated and the cost is higher. In addition, the soiled imperforate sheets are unpleasant to handle, because they have to be folded with hands to fit into the opening of a normal sized trash can.

United States patent 20120325159 to inventor Ronald Penner, issued Dec. 27, 2012 is provided a set of rigid reusable sifting pans. While not vulnerable to claw to shreds, the holes in the pans tend to become easily clogged by wet clumped litter and are very difficult to clean.

The above problems and other problems are addressed by this disclosure as summarized below.

SUMMARY OF THE INVENTION

The present disclosure relates to a system for maintaining the cleanliness of a pet litter box, parts of which may be used separately or in combination with one another, comprises a liner assembly for placement in a cat litter pan. The pan comprises a base, a peripheral wall, which defines an interior space for receiving cat litter. The peripheral wall further includes a rim, inner surface, and outer surface.

The liner assembly includes a plurality of disposable, thin and flexible sheet like liners arranged as a stack. The liners are large enough to completely cover the base, the inner surface, the rim, then substantially drape over the outer surface of the pan. Each liner includes a plurality of space apart sifting apertures, sized and configured to retain organic waste and urine clumps above the liners, while allowing unsoiled litter to flow downwardly to a lower layer when the uppermost layer is lifted. The liner assembly is to be together used with clumping litter for the successive sifting of litter and removal of animal waste without soiling hands, to reduce odor, and for the repeated reuse of unsoiled litter. A solid non apertured liner may set at the bottom layer for pet owners to lift and dispose of the used litter.

The sifting apertures on each liner can be arranged in a grid pattern, between each group of adjacent sifting apertures has a solid portion, which is large enough to cover a sifting aperture of a lower sheet. Each sheet in the stack can be arranged offset with respect to the sheets above and below it such that the sifting apertures on the sheet are located above the solid portions of the sheet below it, and below the solid portions of the sheet above it, to form an apertures closure. The apertures closure arrangement ensures that there is no continuous pathway through the liners, a cat will not pull up two or more liners with its claws and causing lots of free flowing litter sink to the bottom and resulting not enough litter on the top layer. Furthermore, urine is substantially blocked by the solid potions of the next lower sheet, will not penetrate to the bottom and create odors.

Because it may be difficult to shift every other thin slippery sheet in the stack to a uniform distance, each liner may include positioning apertures to facilitate the placement of each sheet in an offset relationship to the sheets above and below it. Each sheet has different locations with the positioning apertures on the sheets above and below it, such that when each of the positioning aperture on a sheet is aligned with the matching positioning aperture on the sheet below it, the sifting apertures on the sheet are centered located above the solid portions of the sheet below it.

The present invention also includes a shielded liner retainer to be removably placed over the pan to retain the liners in a fixed position and to protect the liners from ripping by claws. The shield has a height to prevent a cat from urinating and defecating outside the pan, and is vertically oriented and inserted within the liner retainer. The shield has a bottom edge that is preferably inserted into the interior space of the pan, to define a lower shield portion. A retainer channel is formed between the lower shield portion and the retainer wall of the liner retainer, configured to clamp approximately 15 sheets of liners in a snug position against the peripheral wall of the pan, thereby eliminating the use of a rubber band. The shield acts as an extension of the height of the peripheral wall of the pan. With the help of the shield, the present invention allows the use of a relatively shallow pan and in turn allows the use of smaller liners, to help save cost and be easier for pet owners to handle.

In some embodiments, an attachment assembly is provided for detachably securing a disposable shield to the liner retainer, which is preferably made from low cost recycled corrugated cardboard, when the shield is soiled by cat waste, pet owners can simply change it to a new one.

BRIEF DESCRIPTION OF THE DRAWINGS

The forgoing and more specific objects and advantages of the instant disclosure will become readily apparent to those skilled in the art from the following detailed description of the preferred embodiments thereof taken in conjunction with the drawings as described.

The following call out list of elements can be a useful guide in referencing the element numbers of the drawings.
11 Shielded Litter Box Cleaning System
12 Pan
13 Liner Assembly
14 Liner
15 Solid Non Apertured Liner
16 Shielded Liner Retainer
17 Liner Retainer
18 Shield
20 Base
22 Peripheral Wall
24 Rim
25 Interior Space
26 Inner Surface
28 Outer Surface
29 Flange
30 Litter
31 Inner Edge
32 Outer Edge
33 Sifting Aperture
35 Solid Portion
36 First Positioning Aperture
36' Rear First Positioning Aperture
37 Second Positioning Aperture
37' Rear Second Positioning Aperture
38 Single Positioning Aperture
39 Top Edge
41 Retainer Wall
42 Upper Edge
44 Retainer Roof
46 Inside Edge
47 Outside Edge
48 Retainer Channel
49 Opening
50 Shield Portion
51 Front Shield Portion
52 Rear Shield Portion
54 Left Shield Portion
56 Right Shield Portion
58 Interior Chamber
59 Entryway
61 Bottom Edge
62 Lower Shield Portion
64 Reinforcement Flap
65 Front Reinforcement Flap
66 Rear Reinforcement Flap
67 Left Reinforcement Flap
68 Right Reinforcement Flap
70 Fastening Element
71 Bracket
72 Tab
73 Hole
74 Slot
80 Positioning Board
82 First Positioning Element
84 Second Positioning Element
116 Shielded Liner Retainer
117 Liner Retainer
118 Shield
144 Retainer Roof
150 Shield Portion
151 Front Shield Portion
152 Rear Shield Portion
154 Left Shield Portion
156 Right Shield Portion
164 Reinforcement Flap
167 Reinforcement Flap
168 Upright Portion
169 Folding Line
173 Hole

DETAILED DESCRIPTION OF THE PREFERRED EMBODIMENT

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
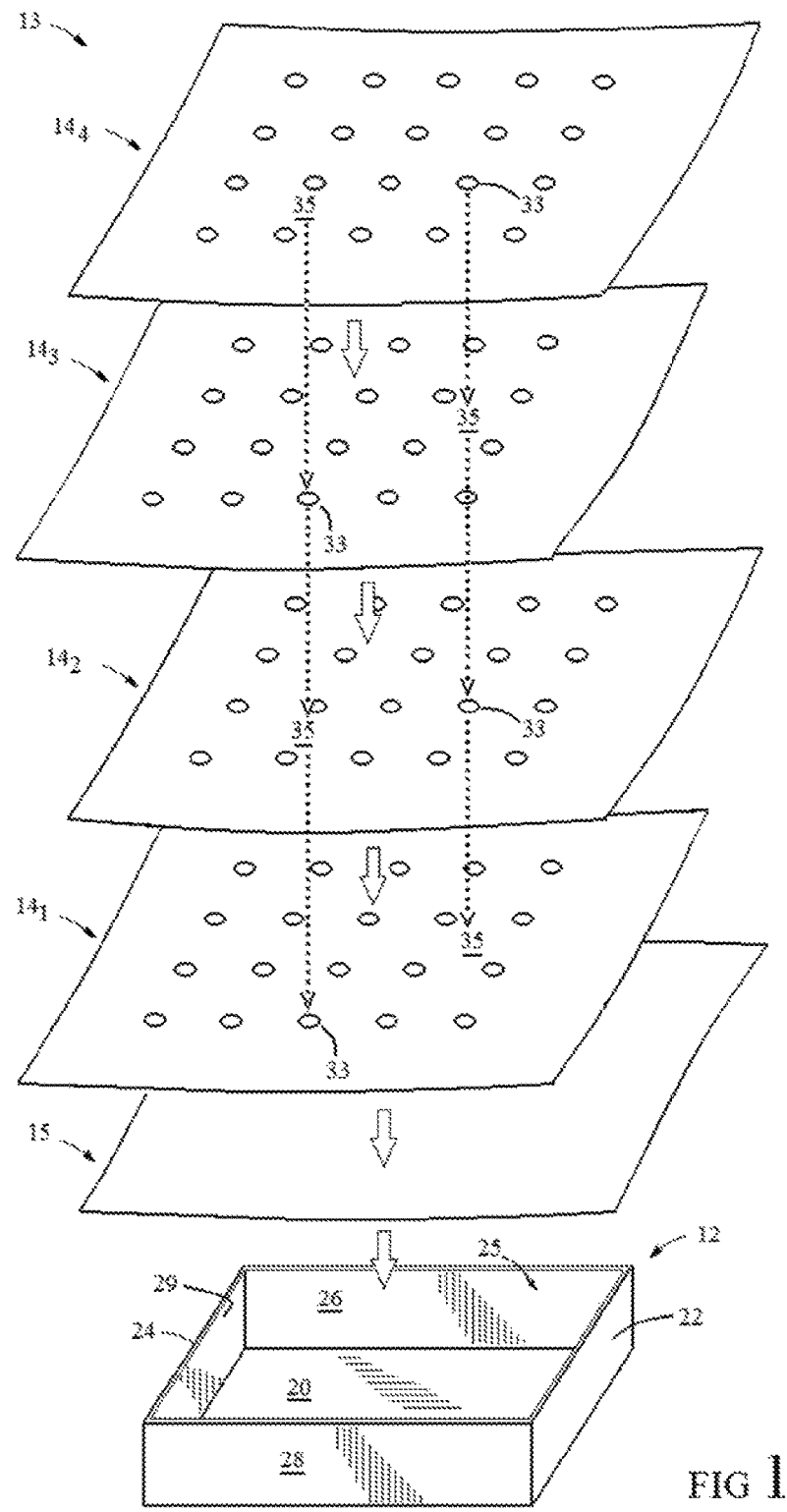
FIG. 1 is an exploded view of a liner assembly for placement in a pan of one of the present disclosure.

Turning now to the drawings in which like reference characters refer to corresponding elements throughout the several views, attention is first directed to FIG. 1, which shows a liner assembly 13 to be placed in a cat litter pan 12. The pan 12 may be made from material such as injection-molded plastic, metal, or card board, comprises a base 20 and a peripheral wall 22, which defines an interior space 25 for receiving cat litter. The peripheral wall 22 further includes a rim 24, inner surface 26, and outer surface 28.

The liner assembly 13 comprises a stack of thin flexible sheet like liners 14, including $14_1$ to $14_4$, arranged above and below each other. Each liner 14 includes a plurality of space apart sifting apertures 33 preferably centrally within the area, sized and configured to retain organic waste and urine clumps above the liners, while allowing unsoiled litter to flow downwardly to a lower layer when the uppermost layer is lifted. The liners 14 are preferably made from plastic or biodegradable plastic sheets, preferably have a thickness approximately 1 mil. The liner assembly 13 is to be together used with clumping litter for the successive sifting of litter and removal of animal waste without soiling hands, to reduce odor, and for the repeated reuse of unsoiled litter. A solid non-apertured liner 15 may sit at the bottom layer for pet owners to lift and dispose the used litters.

Figure 2:
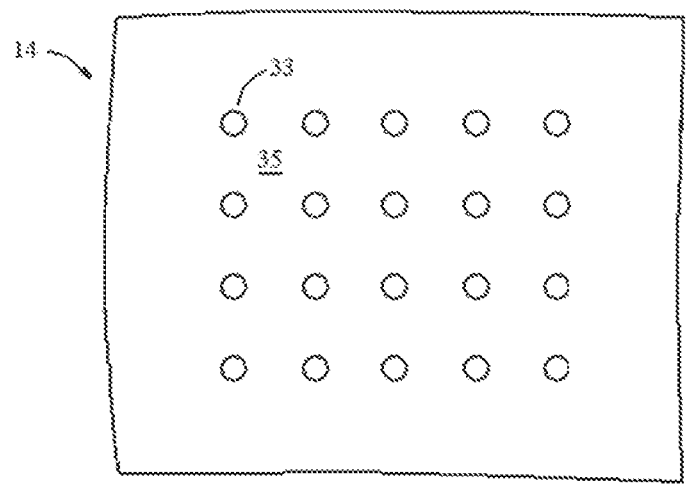
FIG. 2 is a top plan view of a liner of FIG. 1.
Figure 3:
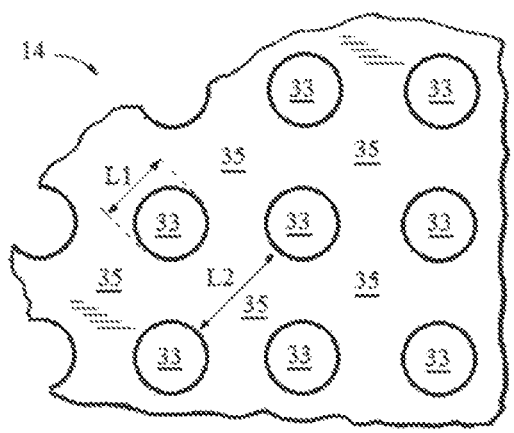
FIG. 3 is a portion of FIG. 2.

FIG. 2 shows the sifting apertures 33 on the liner 14 are arranged in a grid pattern, between each group of adjacent sifting apertures 33 has a solid portion 35. Each solid portion 35 illustrated in FIG. 3 is between a group of four adjacent sifting apertures 33. The sifting aperture 33 has a width or diameter L1, which is preferably approximately 0.33 inch. The solid portion 35 has a width L2, which is the distance between the closest edges of two diagonally adjacent apertures 33. The width L2 is preferably approximately 0.67 inch. Thus, the width L2 between the closest edges of two diagonally adjacent apertures 33 is greater than the width L1 of a sifting aperture 33, such that each solid portion 35 is large enough to fully cover a sifting aperture 33 placed below it.

Figure 4:
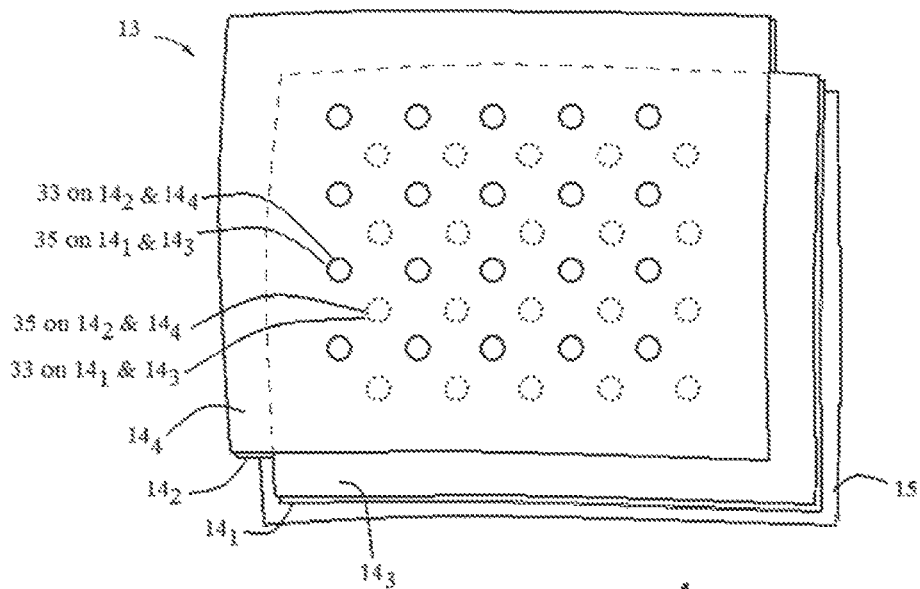
FIG. 4 is a top plan view of the liner assembly of FIG 1.

In one manufacturing process, a number of solid thin flexible liners may be stacked on top of one another and punched with a single shot to form a plurality of sifting apertures 33 on every sheet in the stack, which are initially vertically aligned with one another. Every other sheet in the stack is then shifted a distance to form an apertures closure. As illustrated in FIGS. 1 and 4, each liner 14 in the stack has sifted a distance such that the sifting apertures 33 on the liner $14_2$ are located above the solid portions 35 of the liner $14_1$, and below the solid portions 35 of the liner $14_3$; again, the sifting apertures 33 on the liner $14_3$ are located above the solid portions 35 of the liner $14_2$, and below the solid portions 35 of the liner $14_4$. This procedure is performed repeatedly until each liner 14 in the stack is placed in an offset position relative to the sheet below and above it. FIG. 4 shows an offset liner assembly 13 with apertures closure ready to use. Although only four liners 14 are illustrated, a typical liner assembly 13 may include up to fifteen sheets or more.

The apertures closure arrangement ensures that there is no continuous pathway through the liners, cats will not pull up two or more liners with claws and causing free-flowing litter sink to the bottom and resulting not enough litter on the top layer. Furthermore, urine is substantially blocked by the solid potions of the next lower sheet, will not penetrate to the bottom and create odors.

Figure 5:
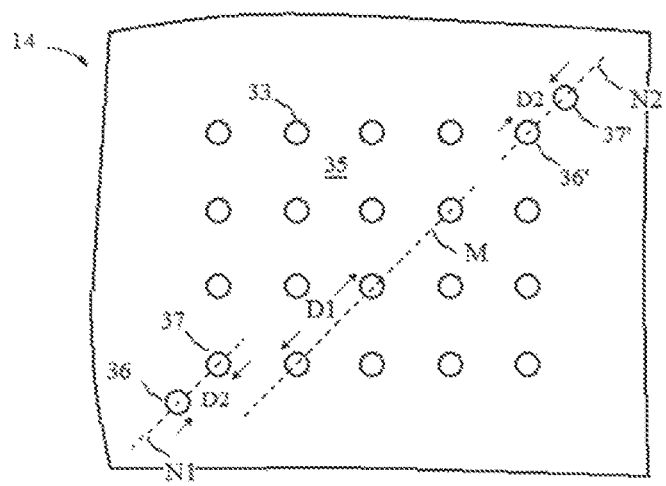
FIG. 5 is a top plan view of a liner with additional two pairs of positioning apertures.

Because it may be difficult to shift every other thin slippery sheet to a uniform distance with respect to a sheet below it, each liner 14 may include at least one positioning aperture to facilitate the placement of each sheet in an offset relationship to a sheet below it. FIG. 5 shows a liner 14 is with additional two pairs of positioning apertures. The first pair includes a first positioning aperture 36 and an adjacent second positioning aperture 37, which are separated from one another by the distance D2, and are on an extending line N1, approximately parallel to one of the extending lines M formed by a row of diagonally adjacent sifting apertures 33. The second pair includes a rear first positioning aperture 36' and an adjacent rear second positioning aperture 37', which are also separated from one another by the distance D2, and are on an extending line N2, approximately parallel to, the extending line N1. The distance D2 is preferably approximately equal to ½ of distance D1 of the distance between two diagonally adjacent sifting apertures 33, that will result in each sifting aperture 33 on a sheet are blocked by, and centered with respect to, the solid portion 35 of a sheet below it. The distance of D2 may also be approximately equal to ½ of distance D1 plus a multiple of distance D1, for example, 1½ distance D1, 2½ distance D1, etc. The positioning apertures can be the same shape and size as the sifting apertures 33, or can be in different shape or size.

Figure 6A:
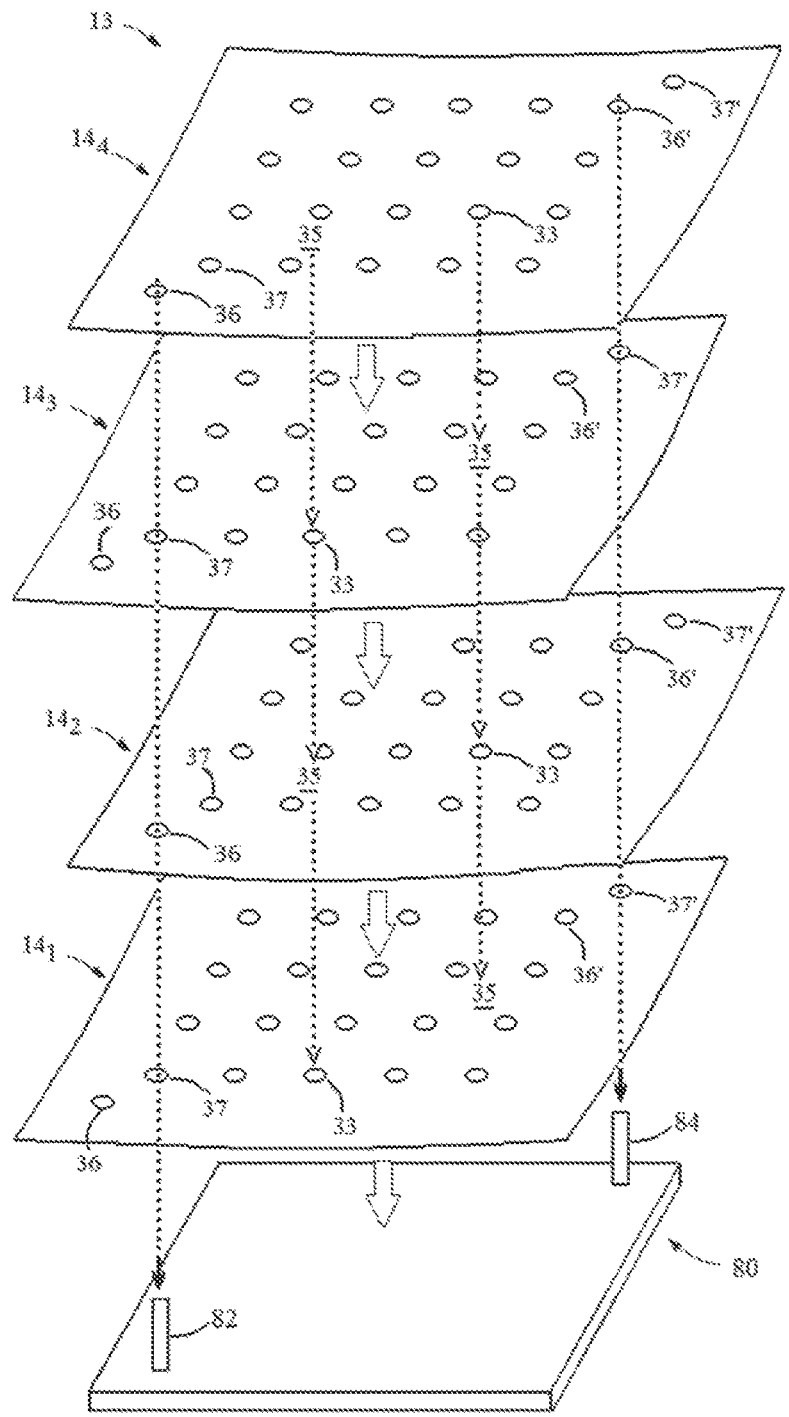
FIG. 6a is an exploded view of a liner assembly of FIG. 5, to show the offset assembly process in a factory.

To place each liner 14 in the stack in the correct offset positions, FIG. 6a shows a factory assembler use a positioning board 80, which is a planar member having pins, nails, or similar second positioning element 84 are spaced from one another by a distance equal to the distance between the two positioning apertures 37 and 37', or 36 and 36'. To begin, the assembler positions a liner $14_1$ on the positioning board 80 to place the second positioning aperture 37 of the first pair through the first positioning element 82 and the second positioning aperture 37' of the second pair through the second positioning element 84. Next, the assembler positions a liner $14_2$ over the liner $14_1$ to place the first positioning aperture 36 of the first pair through the first positioning element 82 and the first positioning aperture 36' of the second pair through the second positioning element 84. This procedure is performed repeatedly until each liner 14 in the stack is placed in an offset position relative to the liners below and above it. As illustrated in FIG. 6a, the sifting apertures 33 on the liner $14_2$ are located above the solid portions 35 of the liner $14_1$, and below the solid portions 35 of the liner $14_3$. Again, the sifting apertures 33 on the liner $14_3$ are located above the solid portions 35 of the liner $14_2$, and below the solid portions 35 of the liner $14_4$.

Figure 6B:
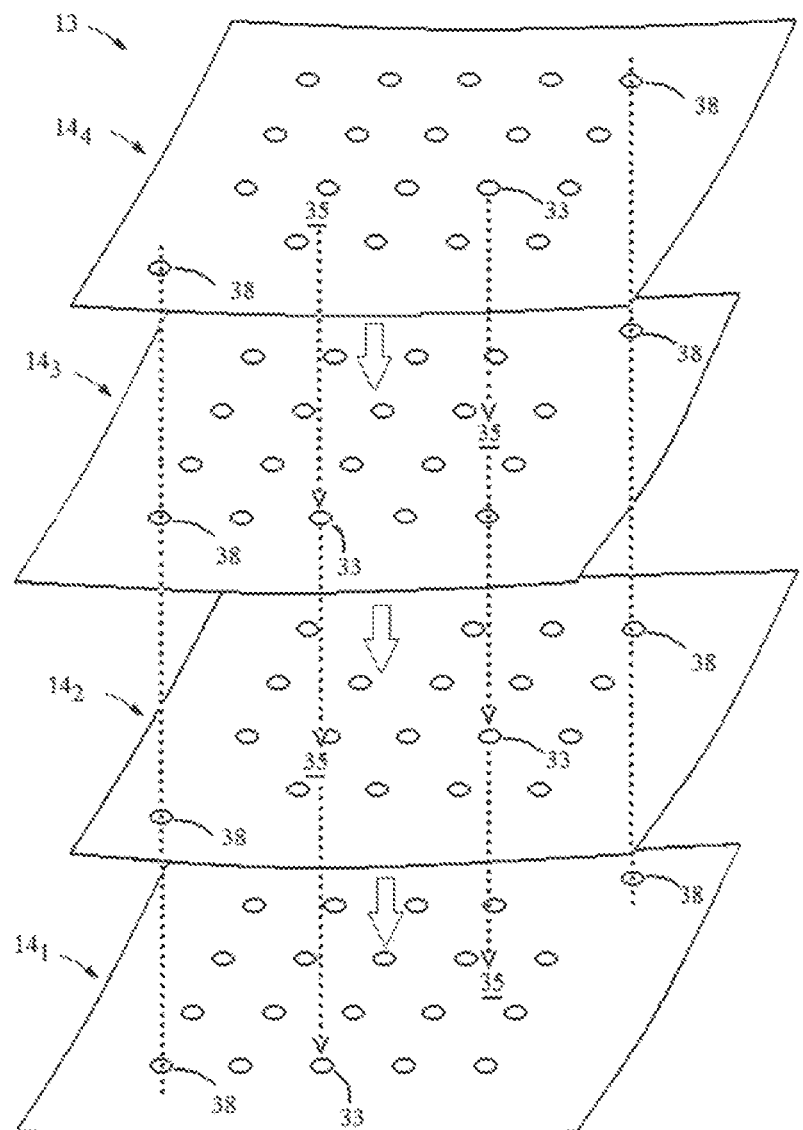
FIG. 6b is an exploded view of a liner assembly with single positioning apertures.

As we can see in FIG. 6a, the first positioning apertures 36 and 36' on the liner $14_1$ and $14_3$, and the second positioning apertures 37 and 37' on liner $14_2$ and $14_4$ are not to be placed through the positioning elements 82 or 84, so they may be omitted and may leave the space solid. As shown in FIG. 6b, each liner 14 may only have two single positioning apertures 38 to facilitate the placement of each liner 14 in an offset relationship to a sheet below it. Each liner $14_1$ to $14_4$ can be identical to one another, in another word, each liner $14_2$ or $14_4$ may have the same aperture pattern as the liner $14_1$, rotated 180 degrees. Thus, there is no need to make tooling for stamping two different sets of liners, as a single stack of liners 14 may be stamped with one pattern of sifting apertures 33 as well as single positioning apertures 38, with half of the sheets belonging to the first set $14_1$, $14_3$, and the other half rotate 180 degree belonging to the second set $14_2$, $14_4$.

Each of the single positioning aperture 38 on the liner $14_2$ is aligned with the matching single positioning aperture 38 on the liner $14_1$ below it. The sifting apertures 33 of the liner $14_2$ are located above the solid portions 35 of the liner $14_1$ below it. Each of the single positioning aperture 38 on the liner $14_3$ is aligned with the matching single positioning aperture 38 on the liner $14_2$ below it. The sifting apertures 33 of the liner $14_3$ are located above the solid portions 35 of the liner $14_2$ below it. This procedure is performed repeatedly until each liner 14 in the stack is placed in an offset position relative to the liners below and above it.

Although shown here as alternating in a one to one pattern, the liners could also be grouped in other alternating patterns, as long as all the liners 14 are alternated in some fairly offset manner. For instance, to save assembly cost, there could be two liners 14 with all sifting apertures 33 aligned, and having an offset arrangement liner 14 above or below these two sheets.

Figure 7:
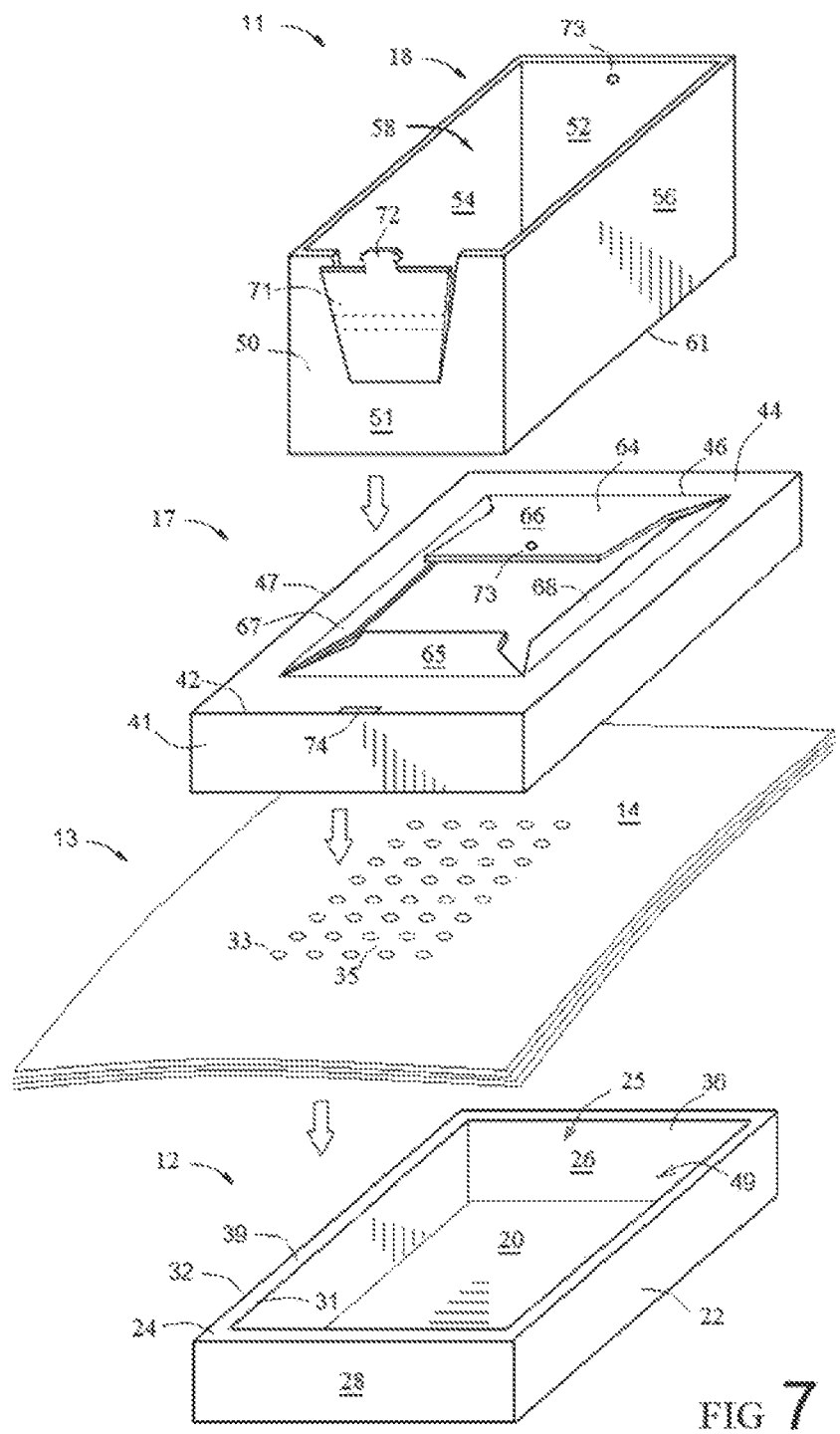
FIG. 7 is an exploded view of a shielded litter box cleaning system of one of the present disclosure.

The present invention also includes a liner retainer 17 and a shield 18 to be removably placed over the pan 12. FIG. 7 shows a shielded litter box cleaning system 11, including a pan 12, a liner assembly 13, a liner retainer 17 and a shield 18.

Figure 8:
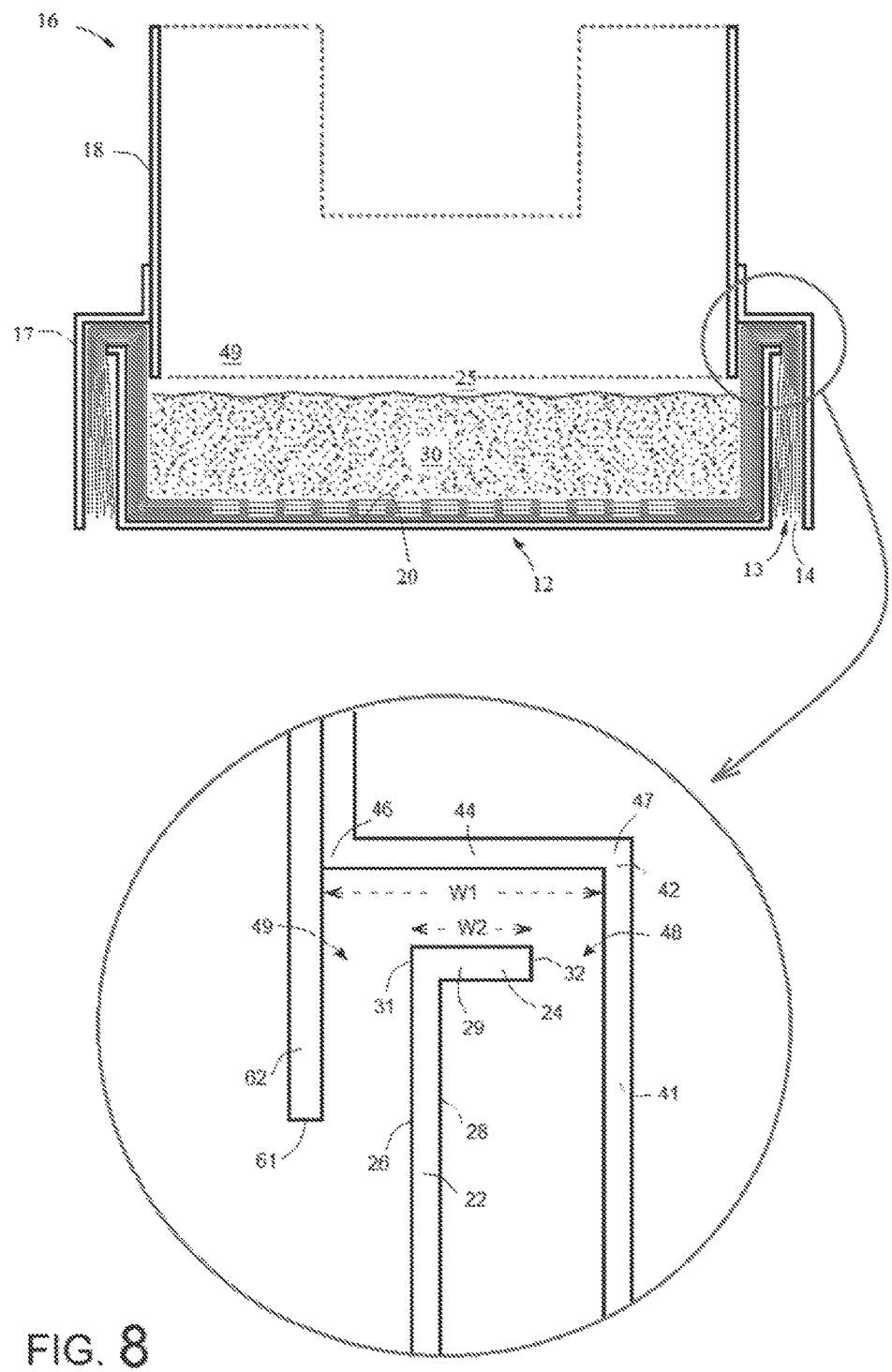
FIG. 8 is a sectional view of a shielded liner retainer placed over a pan.

The pan 12 has a base 20 and a peripheral wall 22 defining an interior space 25 configured to receive a predetermined amount of litter. The peripheral wall 22 further includes a rim 24, an inner surface 26 facing the interior space 25, and an outer surface 28 opposed to the inner surface 26. FIG. 8 shows the rim 24 having: an inner edge 31 defining an opening 49 for a pet to enter and exit the interior space 25 of the pan 12; and an outer edge 32 opposed to the inner edge 31. The pan 12 can be made from injection molded plastic or metal, and the ring 24 preferably has a flange 29 to reinforce the peripheral wall 22. The pan 12 also can be made from corrugated cardboard, where the rim 24 is the top edge 39 of the peripheral wall 22, which does not have a flange, as illustrated in FIG. 7.

The liner assembly 13 is for placement in the pan 12 for the successive sifting of litter 30 and removal of animal waste, which includes a plurality of thin and flexible sheet like liners 14 arranged as a stack. The liners 14 are large enough to completely cover the base 20, the inner surface 26, the rim 24, then substantially drape over the outer surface 28, and a portion of liners may drape below the level of the base 20. Each liner 14 has a plurality of sifting apertures 35, sized and configured to retain organic waste and urine clumps above the liners, while allowing unsoiled litter to flow downwardly to a lower layer when an uppermost layer is lifted. The liners 14 are preferable made from plastic or biodegradable plastic with thickness being approximately 1 mil.

Figure 9:
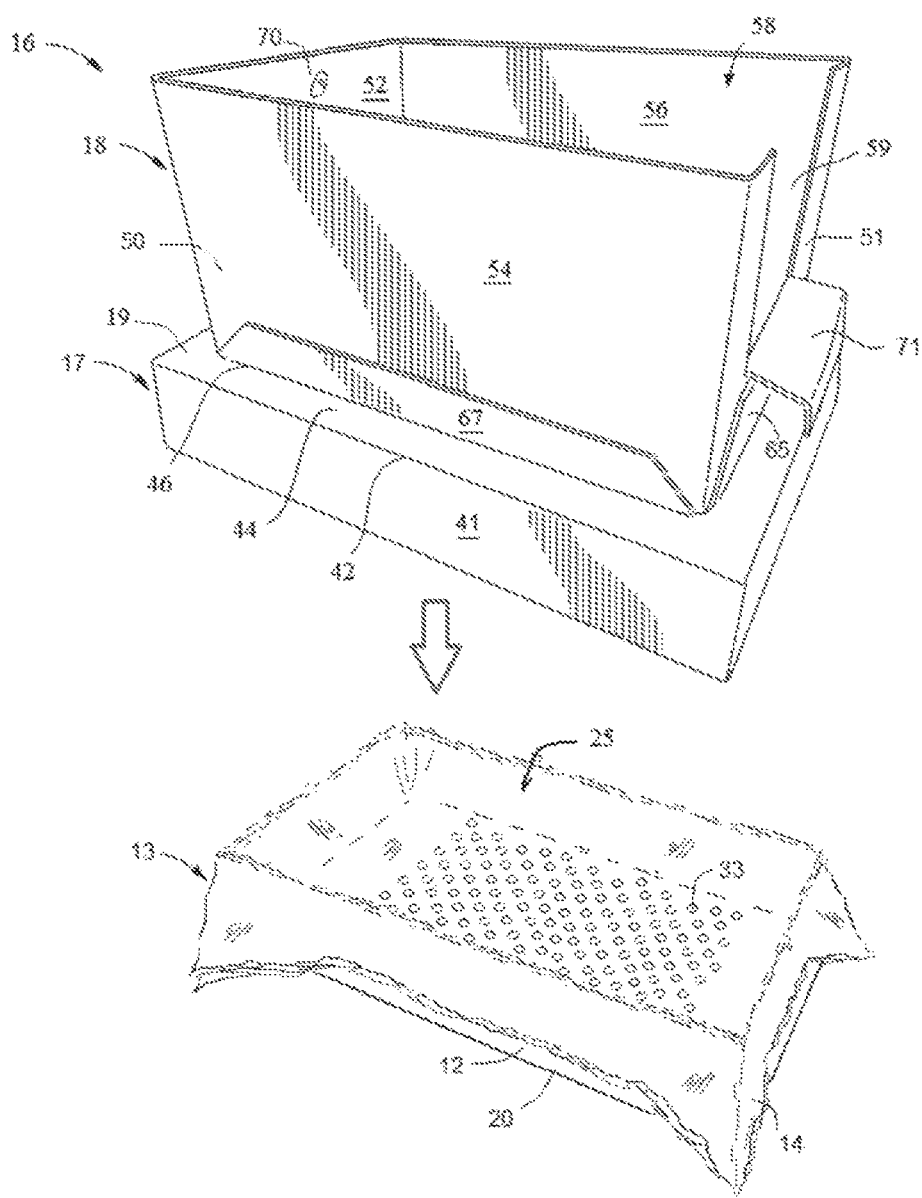
FIG. 9 is an exploded perspective view of FIG. 8.

FIGS. 8 and 9 shows one embodiment of a shielded liner retainer 16, comprising a liner retainer 17 and a shield 18, configured to be removably placed over the pan 12 to cover and retain the liners 14 in a fixed position against the peripheral wall 22 of the pan 12. As best seen in FIG. 8, the retainer wall 41 is extended around the outer surface 28 of the pan 12 to cover and retain the portion of liners 14 that drape over the outer surface 28, the retainer wall 41 that has an upper edge 42. A retainer roof 44 is placed above the rim 24 of the pan 12 to cover the liners on the rim 24. The retainer roof 44 has an inside edge 46 extended inwardly (preferably approximately ½ inch) over the inner edge 31 of the rim 24 below it; and has an outside edge 47 extended outwardly (preferably approximately ¼ inch) over the outer edge 32 of the rim 24 below it. The outside edge 47 of the retainer roof 44 can be formed with the upper edge 42 of the retainer wall 41 as a single unitary unit, defining a liner retainer 17.

As best seen in FIG. 9, the shield 18 has a height to prevent a pet from urinating and defecating outside the pan defining an interior chamber 58 of sufficient size to accommodate a pet. The shield 18 includes a shield portion 50 configured to attach to an inside edge 46 of the retainer roof 44, which may include a front shield portion 51, a rear shield portion 52, a left shield portion 54 and a right shield portion 56. Each shield portion 51, 52, 54, 56 is preferably 10 inches in height. The front shield portion 51 may include an entryway 59 allowing a pet to enter and exit the interior chamber 58. The shield 18 is shown here as having an entryway at a front shield portion 51, but it may also be provided with a top cover and has an entryway on the top cover.

FIG. 8 shows the shield 18 with a bottom edge 61 extending below the inside edge 46 of the retainer roof 44 which is preferably inserted into the interior space 25 of the pan 12, that defines a lower shield portion 62. A channel is formed between the lower shield portion 62 of the shield 18 and the retainer wall 41, which defines a retainer channel 48. The retainer channel 48 is configured to accommodate the portion of liners 14 folded over the rim 24 as well as draped over the outer surface 28 of the pan 12, preferably to cover the portion of the liners against the inner surface 26 above the level of the litter 30. The liners 14 are essentially flat and conform to the base 20 of the pan 12, then upwards near the inner surface 26, folded over the rim 24, and substantially draped over the outer surface 28 of the pan 12. If the liner assembly has 15 sheets each, the liners would be 30 sheets thick after being folded over the rim 24.

The retainer wall 41 is preferably vertically oriented and is preferably parallel to the lower shield portion 62 of the shield 18, such that the liners 14 can be evenly clamped in a snug position against the peripheral wall 22 of the pan 12 to eliminate the use a rubber band. The retainer wall 41 is parallel to the lower shield portion 62, which may be parallel to the peripheral wall 22. The width of the retainer channel 48 (the distance from the lower shield portion 62 to the retainer wall 41, indicated as W1 in the FIG. 10) is preferably minimum ½ inch and maximum 1 inch greater than the width of the rim 24 (the distance from the inner edge 31 to the outer edge 32, indicated as W2). Thus, the retainer channel 48 has appropriate room to accommodate approximately 15 sheets of liners 14.

The liner retainer 17 and the shield 18 can be two detachably connected pieces, and an attachment assembly is provided for detachably securing the shield 18 to the liner retainer 17. The shield 18 is preferably made from low-cost material such as corrugated cardboard, when the shield is soiled by cat waste, pet owners can simply change it to a new one.

As best seen in FIG. 7, the attachment assembly may include a reinforcement flap 64, which may include a front reinforcement flap 65, a rear reinforcement flap 66, a left reinforcement flap 67, and a right reinforcement flap 68. In the pre-assembly configuration illustrated here, the reinforcement flaps 65, 66, 67 and 68 can be formed with the inside edge 46 of the liner retainer 17 and may be folded or bent upwardly during assembly to closely surround and reinforce the shield 18. The front shield portion 51 of shield 18 may comprise a tab 72 depending from a bracket 71, and a slot 74 formed in the liner retainer 17.

Figure 10:
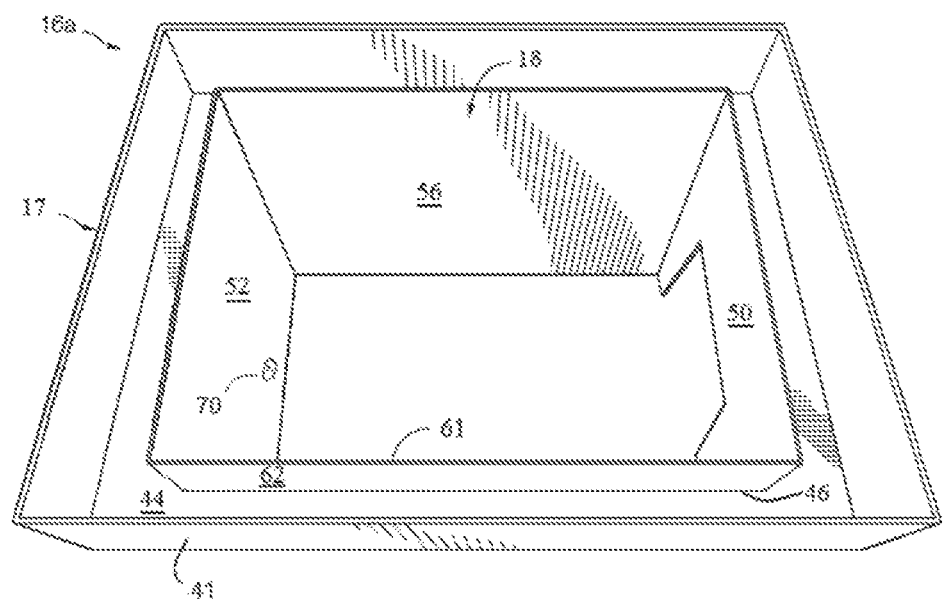
FIG. 10 is a perspective bottom view of the shielded liner retainer of FIG. 9.
Figure 11:
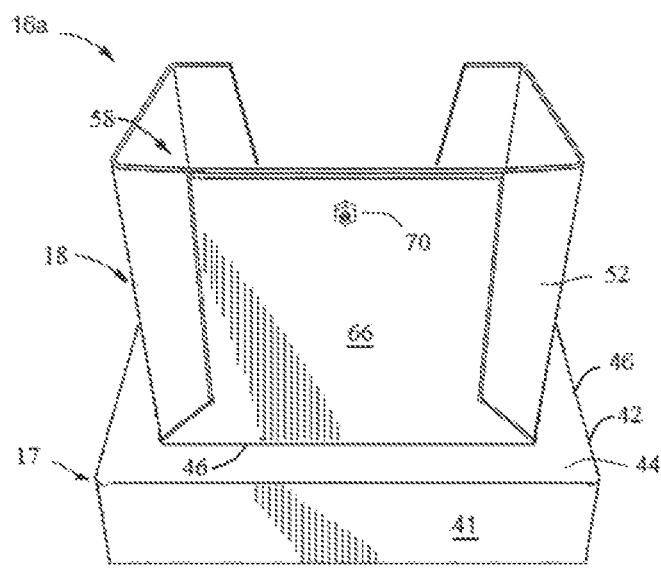
FIG. 11 is a perspective rear view of the shielded liner retainer of FIG. 9.

To assemble the shield 18 with the liner retainer 17 to form a shielded liner retainer 16, the reinforcement flaps 65, 66, 67 and 68 may be bent upwardly, and the shield 18 may be inserted into the inside edge 46 of the liner retainer 17. The bracket 71 then is folded downward and the tab 72 is inserted into the slot 74 in the liner retainer 17, this joins the front shield portion 51 of the shield 18 to the liner retainer 17. FIGS. 9-11 show a fastening element 70 removably securing the rear shield portion 52 of the shield 18 to the rear reinforcement flap 66 of the liner retainer 17. The fastening element 70 can be a screw and bolt extending through the hole 73 on the rear shield portion 52 and the hole 73 on the rear reinforcement flap 66 (shown in FIG. 7), this joins the shield 18 and the liner retainer 17 together as an unitary assembly. The fastening element also can be clips, hook and loop, cable ties, carton sealing tapes, etc. The fastening element 70 for the rear shield portion 52 may also be a tab and slot same as the fastening element for the front shield portion 51.

The liner retainer 17 and the shield 18 also can be attached to each other by adhesive or staples to form an inseparable unit, which is preferably made from more durable material such as corrugated plastic board. The shielded liner retainer 16 also may be made from injection-molded plastic as a single unitary unit.

Although the pan 12, the liner retainer 17, and the shield 18 are shown here to be rectangular, other shapes and wall geometries are also included within the scope of the disclosure. For example, the inside edge 46 of the retainer roof 44 and the shield 18 can be octagonal.

The height of the lower shield portion 62 is the distance from the bottom edge 61 to the inside edge 46 of the retainer roof 44, is preferably approximately 1 inch. So, when a four inches height pan 12 is filled to a typical 2.5 to 3 inches height level with litter 30, there is no more than a ½ inch channel between the surface of litter 30 and the bottom edge 61 of the shield 18, this ensures the liners 14 against the inner surface 26 of the pan 12 is not reachable by cat claws.

The retainer wall 41 is preferably approximately the same height as, or slightly higher than, the vertical height of the peripheral wall 22 of the pan 12, so it may substantially cover the liners that draped over the outer surface 28 of the pan 12, and the shielded liner retainer 16 can be firmly placed over the pan, no latches are needed. This ensures pet owners can easily lift and place back the shielded liner retainer 16 over the pan 12.

The conventional litter pans designed to prevent cats from urinating and defecating outside the pan may have peripheral walls about 10 inches tall, and require liners to have an area of about 40×38 inches which is the most popular size in the market. As seen in FIG. 8, the shield 18 includes a lower shield portion 62 which is below the inside edge 46 of the retainer roof 44, such that the organic waste will only fall to the litter 30, so the shield 18 acts as an extension of the height of the peripheral wall 22 of the pan 12. With the help of the shield 18, the height of the pan can be reduced from 10 inches to as low as 4 inches. Thus, the present disclosure only requires liners as small as about 30×28 inches, which is about 45% smaller than the size of the traditional liners. Smaller liners help to save cost and are easier for pet owners to handle.

Figure 12:
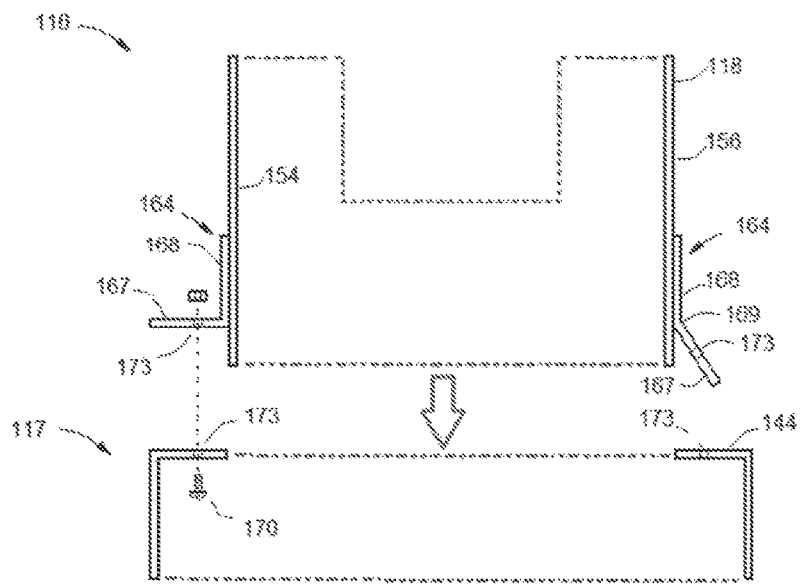
FIG. 12 is a section view of a shielded liner retainer of a second embodiment of an attachment means.
Figure 13:
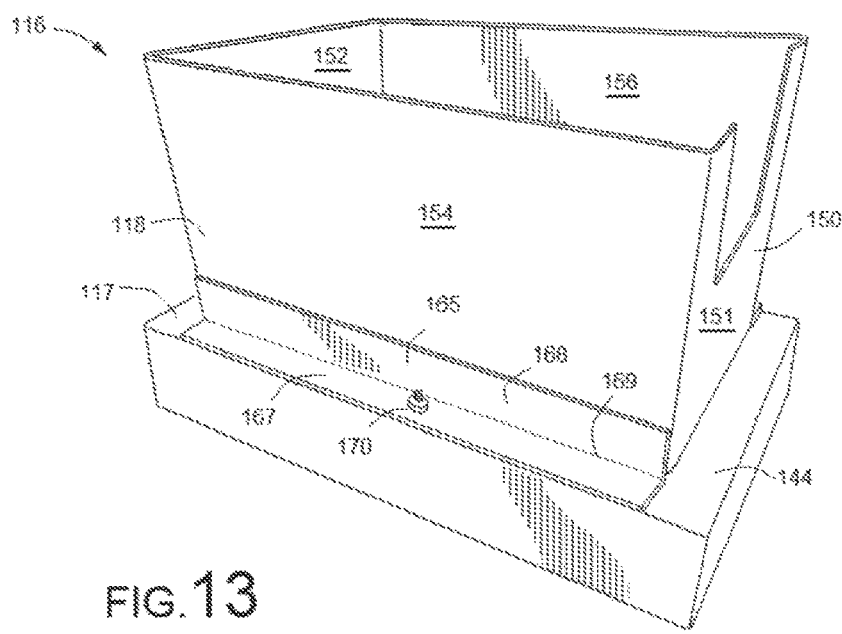
FIG. 13 is a perspective view of FIG. 12.
Figure 14:
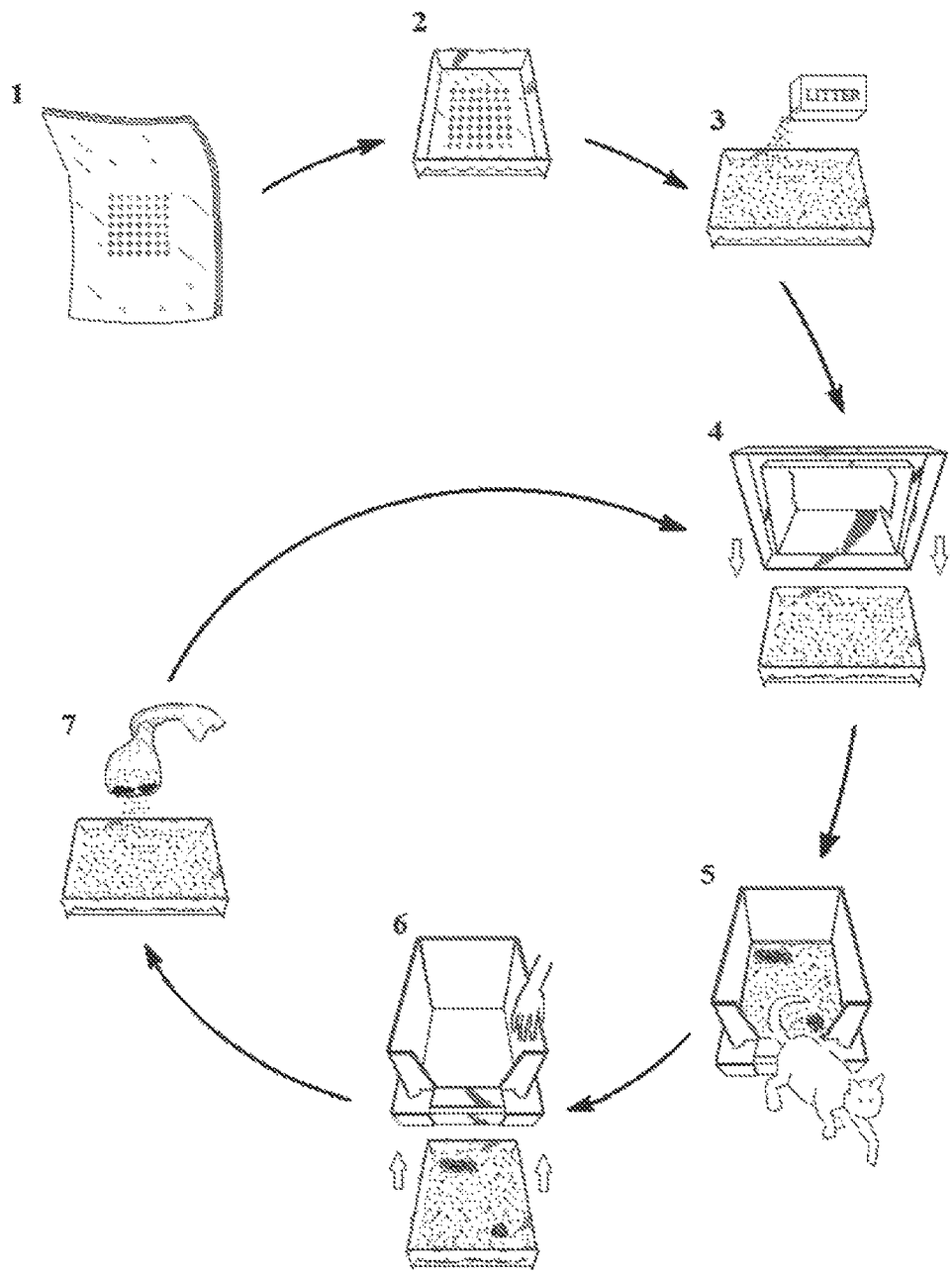
FIG. 14 is a flow chart illustrating an example of the intended use of the shielded litter box cleaning system.

FIGS. 12 and 13 show another embodiment of a shielded liner retainer 116. The shield 118 and the liner retainer 117 are two separate pieces. An attachment assembly is provided for detachably securing the shield 118 to the liner retainer 117. The shield 118 may have a pair of reinforcement flaps 164, which can be attached to the left shield portion 154 and the right shield portion 156, but may also be attached to the front shield portion 151 and the rear shield portion 152. The shield 118 and the reinforcement flaps 164 are preferably made from disposable corrugated cardboard. The reinforcement flap 164 has an upright portion 168 attached with the shield 118, and has a horizontal portion 167 configured to be placed above the retainer roof 144 of the liner retainer 117. The upright portion 168 can be attached with the shield 118 by adhesive, stables or screw and bolts or other connectors. In the pre-assembly configuration, the horizontal portion 167 and the upright portion 168 can be formed from a single sheet and have a folding line 169. To assemble the shield 118 to the liner retainer 117, the horizontal portion 167 of the reinforcement flap 164 may bent upwardly alone the folding line 169, and then places above the retainer roof 144. FIG. 15 shows a fastening elements 170 which can be a set of screw and bolt, is extending through the hole 173 of the reinforcement flap 167 and the hole 173 of the retainer roof 144. This joins the shield 118 and the liner retainer 117 together as an unitary assembly.

FIG. 16 diagrams the steps for using the litter box cleaning system as follows:
1) Pet owner prepares a stack of liner assembly.
2) Pet owner places the liners in a pan, such that the liners completely cover the base, the inner surface, the rim, and substantially drape over the outer surface of the pan.
3) Pet owner pours in 2.5 to 3 inches of clumping litter.
4) Pet owner places the shielded liner retainer over the pan to cover the liners.
5) Pets start to use the little box.
6) Pet owner removes the shielded liner retainer.
7) Pet owner removes the top most liner, allowing clean litter to be sifted down to the next layer and then disposes the soiled liner with clumped cat waste.
8) The shielded liner retainer is then placed back on top of the pan for reusing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed:

1. A shielded litter box cleaning system, comprising:
   a. a pan having a base and a peripheral wall defining an interior space configured to receive a predetermined amount of litter, wherein the peripheral wall includes a rim, an inner surface facing the interior space, and an outer surface opposed to the inner surface, wherein the rim further includes an inner edge defining an opening for a pet to enter and exit the interior space, wherein the rim includes an outer edge opposed to the inner edge;
   b. a liner assembly for placement in the pan for the successive sifting of litter and removal of animal waste, wherein the liner assembly includes a plurality of thin and flexible sheet like liners arranged as a stack, wherein the liners are large enough to completely cover the base, the inner surface, the rim, and drape over an outer surface of the pan, wherein each liner has a plurality of sifting apertures, sized and configured to retain organic waste and urine clumps above the liners, while allowing unsoiled litter to flow downwardly to a lower layer when an uppermost layer is lifted;

c. a liner retainer configured to place over the peripheral wall of the pan to retain the liners in a fix position, comprising:
  i. a retainer wall extends around said outer surface of the pan, wherein the retainer wall has a height to retain the liners against the said outer surface, wherein the retainer wall has an upper edge; and
  ii. a retainer roof extending inwardly from the upper edge of the retainer wall, wherein the retainer roof has an inside edge extends inwardly beyond the inner edge of the rim below it, and d. a shield has a height to prevent a pet from urinating and defecating outside the pan when positioned therein, wherein the shield abuts the inside edge of the retainer roof, wherein the shield includes a shield portion configured to attach to said inside edge of the retainer roof.

2. The shielded litter box cleaning system of claim 1, wherein the shield has a bottom edge extends below the inside edge of the retainer roof and defines a lower shield portion, wherein a channel is formed between the lower shield portion of the shield and the retainer wall defining a retainer channel configured to accommodate the liners against said peripheral wall of the pan.

3. The shielded litter box cleaning system of claim 2, wherein the retainer channel has a width (W1) which is the distance from the lower shield portion to the retainer wall, wherein the rim of the pan has a width (W2) which is the distance from the inner edge to the outer edge, wherein (W1) is at least 1/8" greater than (W2).

4. The shielded litter box cleaning system of claim 2, wherein the lower shield portion of the shield is vertically oriented, wherein the retainer wall is vertically oriented.

5. The shielded litter box cleaning system of claim 4, wherein the retainer wall is at least 2 inches high.

6. The shielded litter box cleaning system of claim 5, wherein the retainer wall is at least the same height as the vertical height of the peripheral wall of the pan.

7. The shielded litter box cleaning system of claim 2, wherein the lower shield portion of the shield is inserted into the interior space of the pan.

8. The shielded litter box cleaning system of claim 1, wherein at least a portion of a liner drapes below the level of the base of the pan.

9. The shielded litter box cleaning system of claim 1, wherein an attachment assembly is provided for detachably securing the shield to the liner retainer, wherein the attachment assembly comprises a fastening element to form a detachable interconnection therewith.

10. The shielded litter box cleaning system of claim 9, wherein the attachment assembly comprises a reinforcement flap configured to attach to and reinforce said shield portion of the shield to the liner retainer.

11. The shielded litter box cleaning system of claim 10, wherein the reinforcement flap is formed with the inside edge of the retainer roof.

12. The shielded litter box cleaning system of claim 11, wherein the reinforcement flap is bent upwardly during assembly to the shield.

13. The shielded litter box cleaning system of claim 10, wherein the reinforcement flap is attached with said shield portion of the shield.

14. The shielded litter box cleaning system of claim 13, wherein the reinforcement flap is bent upwardly during assembly to the liner retainer.

15. The shielded litter box cleaning system of claim 1, wherein the liner assembly further comprises: solid portions formed between each group of adjacent sifting apertures, wherein each solid portion is large enough to fully cover a respective sifting aperture placed below the solid portion, wherein the sifting apertures of a liner in the stack are located above the solid portions of a liner below it, and below the solid portions of a liner above it.

16. The shielded litter box cleaning system of claim 15, wherein each liner in the stack is offset with respect to the liners above and below it, such that the sifting apertures of the liners are located above the solid portions of the liner below it, and below the solid portions of the liner above it.

17. The shielded litter box cleaning system of claim 16, wherein the solid portions completely cover the sifting apertures to form aperture closures.

18. The shielded litter box cleaning system of claim 15, wherein each liner has at least one pair of positioning apertures, including a first positioning aperture and a second positioning aperture to facilitate the placement of each liner in an offset relationship to a liner below it, wherein each positioning aperture has a location such that when each of the first positioning aperture on a liner is aligned with the matching second positioning aperture on a liner below it, wherein the sifting apertures of the liner are located above the solid portions of the liner below it.

19. The liner assembly of claim 18, wherein each sifting aperture on a liner is located a distance (D1) from a diagonally adjacent sifting aperture, wherein the first positioning aperture is located a distance (D2) from the adjacent second positioning aperture, wherein (D2) is equal to 1/2 of (D1), wherein the first positioning aperture and the adjacent second positioning aperture are on an extending line, parallel to one of the extending lines formed by a row of diagonally adjacent sifting apertures.

20. The liner assembly of claim 15, further comprising: wherein each liner has at least one single positioning aperture to facilitate the placement of each liner in an offset relationship to a liner below it, wherein each of the single positioning aperture on a liner is aligned with the matching single positioning aperture on a liner below it, the sifting apertures of the liner are located above the solid portions of the liner below it.

* * * * *